Nov. 28, 1950     L. R. ENGVALL     2,531,414

ELECTRICAL PRESSURE MEASURING DEVICE

Filed June 16, 1947

INVENTOR
LENARD R. ENGVALL
BY J. F. Mothershead
ATTORNEY

Patented Nov. 28, 1950

2,531,414

UNITED STATES PATENT OFFICE 2,531,414

ELECTRICAL PRESSURE MEASURING DEVICE

Lenard R. Engvall, Coulee Dam, Wash.

Application June 16, 1947, Serial No. 755,011

3 Claims. (Cl. 73—398)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to an electrical measuring device and more particularly to a device including an impedance bridge for measuring changes in position.

It is frequently necessary to measure small variations in the positions of metal objects such as the amount of eccentricity in a turbine shaft. This problem is particularly difficult when it is desirable to obtain for comparison, records, simultaneously made at one point, of movements at several widely separated points. Devices previously known and used for this purpose have depended on mechanical contacts with moving parts and mechanical amplification. Comparison of records obtained at different points is a slow process.

One of the objects of this invention is to provide a means including an impedance bridge for measuring small changes in position.

Another object is to provide a means for simultaneously at one point recording movements at several widely separated points.

These and other objects will be apparent from the following specification taken in connection with the accompanying drawing in which.

Figure 1:
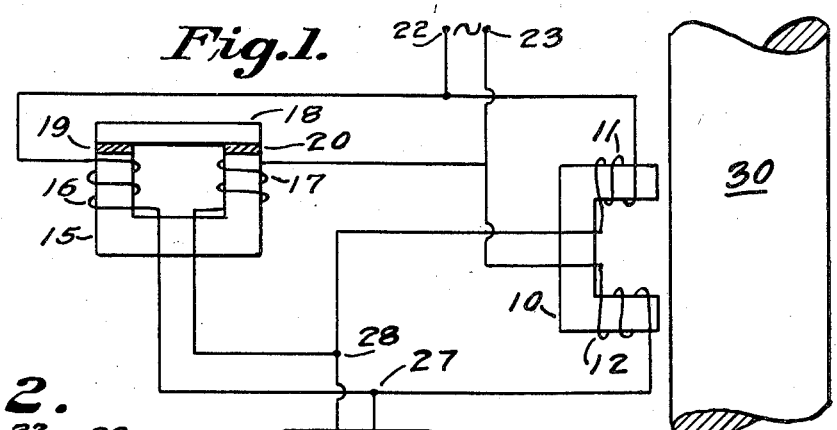
Fig. 1 is a schematic diagram of a system embodying the principles of this invention.

In Fig. 1 U-shaped core 10 has wound thereon two coils 11 and 12, respectively. U-shaped core 15 has wound thereon coils 16 and 17, respectively. Bridging member 18 extends across the open end of core 15 and is spaced therefrom in close relation thereto by non-magnetic spacers 19 and 20. Cores 10 and 15 and member 18 are preferably made of ferromagnetic material, such as laminated iron. Bridging member 18 may be of solid iron or steel to more nearly match the metal part which is to be studied.

A source of alternating current is provided at terminals 22 and 23. Coils 11 and 17 are connected in series across terminals 22 and 23. Coils 12 and 16 are also connected in series across terminals 22 and 23. Indicator 25 is connected to the junction 28 between coils 11 and 17 and to the junction 27 between coils 12 and 16.

A shaft 30 preferably of ferromagnetic material, of relatively large diameter is shown in Fig. 1 as the metal part to be studied. In this case the eccentricity of the shaft is to be determined. Core 10 is mounted with its open end in close proximity to the shaft 30. It is preferable to mount core 10 in an adjustable mounting to permit setting the average air gap of the core 10 to a magnitude closely approximating the air gap in the core 15. It will be seen that as the eccentric shaft 30 rotates it will cyclically approach and recede from core 10 by a slight amount thus increasing and decreasing the air gap in the magnetic path of core 10.

Figure 2:
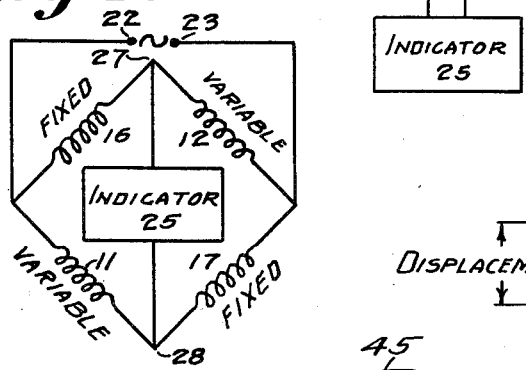
Fig. 2 is a schematic diagram explaining the principles of this invention.

The circuit shown in Fig. 1 provides an impedance bridge shown more clearly in more schematic form in Fig. 2 where coils 16 and 17 of fixed impedance are shown connected in the bridge circuit with coils 11 and 12 of variable impedance. Under balanced conditions where the air gaps in the magnetic paths of cores 10 and 15 are equal, the voltage drop across each impedance is the same and the voltage difference at the junction points 27 and 28 is therefore zero. When the air gaps of cores 10 and 15 are unequal, the impedance of the coils associated with the core having the smaller air gap is the higher and the voltage drop across those coils is higher. Since each pair of coils whose impedance varies together is connected into diagonally opposite sides of the bridge, it will be seen from Fig. 2 that if the voltage at the upper output terminals 27 increases, the voltage at the lower junction point 28 decreases. The difference between the voltage of junctions 27 and 28 will then vary as the air gap in the magnetic path of core 10, a small difference in the distance of air gap making a large difference in output voltage.

Figure 3:
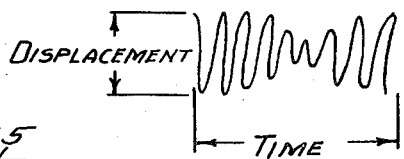
Fig. 3 is a curve illustrating the type of indication provided by this invention.

Indicator 25 is preferably a recording device such as an oscillograph. Fig. 3 shows the type of record produced by the output of one impedance bridge. The amplitude of the alternating wave at any time is a measure of the distance between the open end of core 10 and the moving object such as 30. In a ratio commonly used in practice a change of one inch in the record in indicator 25 indicated a change in position of the metal part studied of 0.015 inch. The device may be calibrated by noting the indication on indicator 25 when core 10 is placed at several measured distances from the shaft 30. Normally the device is operated at such an air gap setting that the output voltage will not go through zero.

Figure 4:
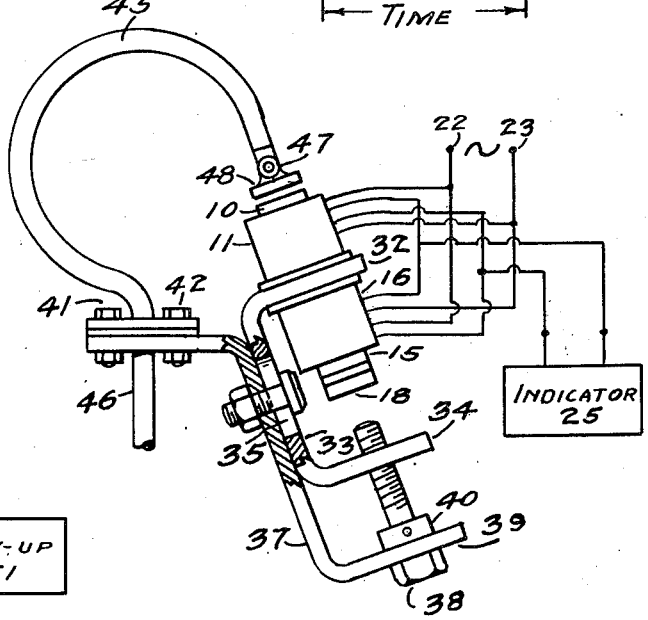
Fig. 4 is a schematic diagram of a fluid pressure gauge and recorder therefor used in a system embodying the principles of this invention.

In Fig. 4 is shown the impedance bridge of Fig. 2 used with a Bourdon tube to determine fluid pressure. Core 10 carrying coils 11 and 12 corresponds to the variable impedance unit of Fig. 1. Core 15 carrying coils 16 and 17 and bridged by member 18 corresponds to the fixed impedance unit of Fig. 1. Cores 10 and 15 are mounted on flange 32 of member 33 which also includes a lower flange 34 and a slot 35 in its center portion. Member 33 is slidably mounted on member 37 by a bolt which passes through member 37 and slot 35. Member 33 is adjusted in position along member 37 by a bolt member 38 mounted through a hole in flange member 39 projecting from the lower part of member 37. Bolt member 38 freely rotates in the hole in flange 39 and is held from axial motion by a collar 40 held in place by a set screw. Bolt member 38 is threaded in a hole in flange member 34 so that rotation of bolt member 38 adjusts the position of member 33 with respect to member 37. Member 37 is attached by bolts 41 and 42 to the base of Bourdon tube 45.

Input tube 46 extends through a hole in the upper part of member 37 and communicates therethrough to Bourdon tube 45. The free end of Bourdon tube 45 is pivotally and adjustably attached by means of screw 47 to metal member 48, preferably of ferromagnetic material, which bridges the open end of core 10 and is held in closely spaced relation thereto by Bourdon tube 45.

In operation as the pressure increases in Bourdon tube 45, which is oval in cross section, the tube will tend to straighten out moving bridging member 48 away from core 10 increasing the air gap therein. Coils 11 and 12 and 16 and 17 are interconnected with indicator 25 and alternating current source 22 and 23 as shown in Figs. 1 and 2. Since the position of member 48 is a function of the fluid pressure in tube 45 there is provided at indicator 25 an indication of the fluid pressure in tube 46. This device may be calibrated by applying one or more known pressures to the Bourdon tube 45 and noting the indication at indicator 25.

Figure 5:
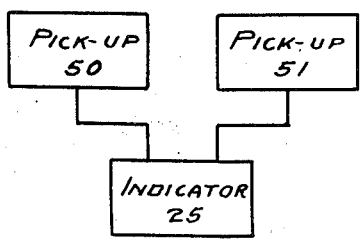
Fig. 5 is a block diagram showing the use of this invention in simultaneous recording at one point movements at a plurality of separated points.

In Fig. 5 is shown a block diagram illustrating the manner in which movements of separated objects may be indicated at a central point. Pick-up devices 50 and 51 are similar to the pick-up device shown in Figs. 1 and 4 and include a variable impedance unit of elements 10, 11 and 12 and a fixed impedance unit of elements 15, 16, 17 and 18. In this system indicator 25 is an oscillograph having means for recording a plurality of voltages simultaneously, preferably on a common time coordinate.

It will be understood that this invention is practiced more advantageously when the object to be studied, such as elements 30 or 48, is of a ferromagnetic material. However, the invention may be practiced as long as the object (30 or 48) under study has a permeability sufficiently different from that of air so that as the object changes position the reluctance of the magnetic path in core 10 and the impedance of coils 11 and 12 are varied. The measuring circuit will be more readily balanced if the bridging member 18 has approximately the magnetic permeability of the object (30 or 48) and if the magnetic spacers 19 and 20 have approximately the total thickness of the average total length of air gap in the magnetic path of core 10.

The invention may be used to measure deformation of structural members such as the movement of bridge spans under load. It permits investigation of the effect of hydraulic disturbances on water wheel generators by giving simultaneous records of the movement of the machine with changes in pressures in penstock, scroll case and draft tube. In general it may be used wherever records or indication are required of mechanical movement or temperatures or gaseous or hydraulic pressures.

It will be seen that this invention provides a means for measuring distances that is simple of construction, accurate in result, convenient in use and which has the added advantage of permitting the central recording of a plurality of movements at widely separated points.

What is claimed is:

1. In combination a first U-shaped ferromagnetic core on which are wound two coils, a second U-shaped ferromagnetic core on which are wound two coils, said second core having a fixed magnetic member bridging its open end and closely spaced therefrom, one coil of said first core and one coil of said second core being connected in series across a source of alternating potential to form a first pair of arms of a bridge circuit, the other coils of said first and second cores being connected in series across said source of alternating potential to form a second pair of arms of said bridge, said coils being so connected in said bridge circuit that two coils of each core form opposite arms, an indicating device connected across the mid junctions of said opposite pairs of arms, a metal member movably mounted in closely spaced relation to the open end of said first core, said movably mounted member being moved by a Bourdon tube, the movement of which is an indication of fluid pressure therein.

2. The combination of claim 1, additionally including means for adjusting the angular relation between the end of the Bourdon tube and the movable metal member.

3. The combination of claim 1, additionally including means for moving the first core to adjust the distance between the end thereof and said movable metal member.

LENARD R. ENGVALL.

REFERENCES CITED

The following references are of record in the file of this patent:

UNITED STATES PATENTS

| Number | Name | Date |
|---|---|---|
| 1,969,536 | Winne | Aug. 7, 1934 |
| 2,020,067 | Keinath | Nov. 5, 1935 |
| 2,240,184 | Hathaway | Aug. 29, 1941 |
| 2,269,152 | Hathaway | Jan. 6, 1942 |
| 2,320,881 | Newton | June 1, 1943 |
| 2,338,732 | Nosker | Jan. 11, 1944 |
| 2,361,738 | Bird | Oct. 31, 1944 |

FOREIGN PATENTS

| Number | Country | Date |
|---|---|---|
| 368,006 | Great Britain | Sept. 25, 1931 |
| 559,149 | Great Britain | July 8, 1943 |